United States Patent
Perlin et al.

(10) Patent No.: US 7,239,293 B2
(45) Date of Patent: Jul. 3, 2007

(54) AUTOSTEREOSCOPIC DISPLAY

(75) Inventors: Kenneth Perlin, New York, NY (US); Salvatore Paxia, New York, NY (US); Joel S. Kollin, Brooklyn, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/909,927

(22) Filed: Jul. 20, 2001

(65) Prior Publication Data

US 2002/0015007 A1  Feb. 7, 2002

Related U.S. Application Data

(63) Continuation-in-part of application No. 09/312,998, filed on May 17, 1999, now Pat. No. 6,239,830, which is a continuation-in-part of application No. 09/010,313, filed on Jan. 21, 1998, now Pat. No. 6,061,084.

(60) Provisional application No. 60/219,845, filed on Jul. 21, 2000.

(51) Int. Cl.
  G09G 5/00 (2006.01)
  H04N 13/04 (2006.01)
(52) U.S. Cl. .................. 345/7; 345/6; 348/51
(58) Field of Classification Search ................ 345/6–9, 345/419; 348/51–60, 48; 359/458, 460, 359/402
See application file for complete search history.

(56) References Cited

U.S. PATENT DOCUMENTS

| | | | | |
|---|---|---|---|---|
| 5,231,521 A * | 7/1993 | Johnson et al. | ............... | 349/18 |
| 5,712,732 A * | 1/1998 | Street | .................. | 359/630 |
| 5,808,599 A * | 9/1998 | Allio | ...................... | 345/6 |
| 5,825,337 A * | 10/1998 | Wiseman et al. | ............... | 345/6 |
| 5,880,704 A * | 3/1999 | Takezaki | ................ | 345/6 |
| 5,886,675 A * | 3/1999 | Aye et al. | ................ | 345/7 |
| 6,049,424 A * | 4/2000 | Hamagishi | ............... | 359/464 |
| 6,057,811 A * | 5/2000 | Edwards | ................ | 345/8 |
| 6,377,229 B1 * | 4/2002 | Sullivan | ................ | 345/6 |
| 6,816,158 B1 * | 11/2004 | Lemelson et al. | .......... | 345/419 |

\* cited by examiner

Primary Examiner—Richard Hjerpe
Assistant Examiner—Kevin M. Nguyen
(74) Attorney, Agent, or Firm—Ansel M. Schwartz

(57) ABSTRACT

An apparatus for displaying an image to an observer. The apparatus comprises a display screen upon which stripes of the image appear in at least three distinct phases. The apparatus comprises a light blocking shutter disposed in front of the display screen forming a stripe pattern which lets through only ⅓ of each stripe of the image on the display screen during each of the at least three distinct phases. The apparatus comprises a computer connected to the display screen and the light blocking shutter which changes the phases so in each phase the stripe pattern is shifted laterally, which renders 2 3D scenes corresponding to the eyes of the observer, which produces a proper left/right orientation pattern for each of the three phases and which interleaves the left/right orientations into three successive time phases as red, green and blue, respectively. The apparatus comprises an eye tracker for identifying the locations of the observers' eyes and providing the location to the computer. A method for displaying an image to an observer.

21 Claims, 7 Drawing Sheets

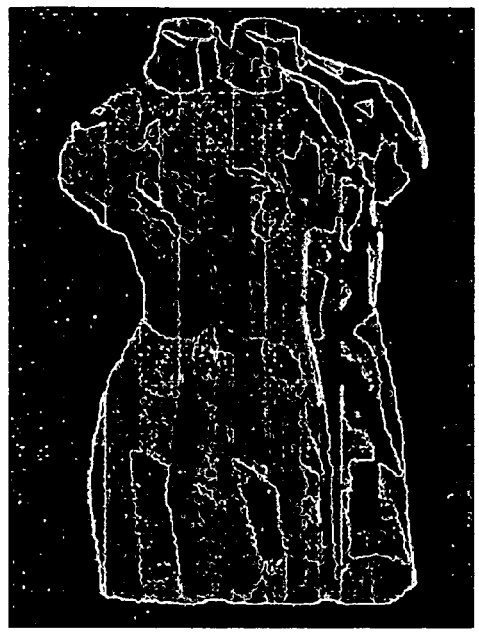
FIG.9
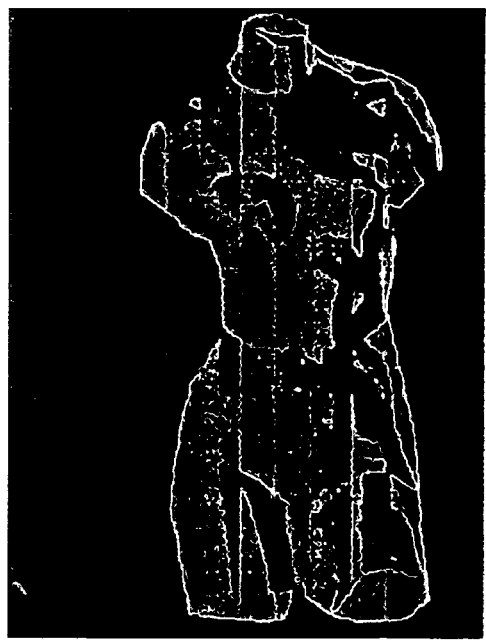 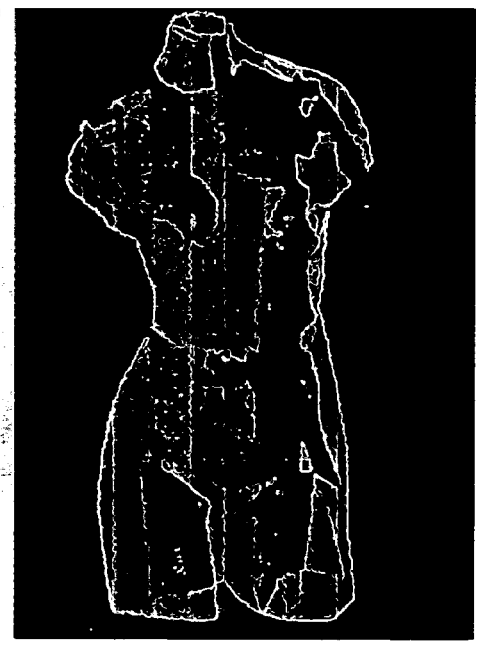
FIG.10a  FIG.10b

2 EYE TRACKING SYSTEMS USED FOR STEREO APPLICATION. THE CROSSED POLARIZED STOP THE IR LIGHT FROM ONE REACHING THE OTHER (AND VICE-VERSA).

AUTOSTEREOSCOPIC DISPLAY

This is a continuation-in-part of U.S. application Ser. No. 09/312,998, now U.S. Pat. No. 6,239,830, filed May 17, 1999; which is a continuation-in-part of U.S. application Ser. No. 09/010,313, now U.S. Pat. No. 6,061,084, filed on Jan. 21, 1998.

This application claims the benefit of U.S. Provisional Application No. 60/219,845 filed Jul. 21, 2000.

FIELD OF THE INVENTION

The present invention is related to a display device which solves a long-standing problem: to give a true stereoscopic view of simulated objects, without artifacts, to a single unencumbered observer, while allowing the observer to freely change position and head rotation by using three phases of stripes of the image.

BACKGROUND OF THE INVENTION

Computer graphics, even when rendered in high quality, still appears flat when displayed on a flat monitor. Various approaches toward creating true stereoscopy have been proposed so that the objects that are simulated will look as though they are really in front of the observer [Okoshi, T. Three-Dimensional Imaging Techniques. Academic Press, New York 1976. ISBN 0-12-525250-1; L. Lipton, et. al., U.S. Pat. No. 4,523,226, Stereoscopic Television System, Jun. 11, 1985; and L. Lipton, and J. Halnon. Universal Electronic Stereoscopic Display. Stereoscopic Displays and Virtual Reality Systems III, Vol. 2653, pp. 219–223, SPIE, 1996], all of which are incorporated by reference herein]. These fall into various categories. The most common form of stereo display uses shuttered or passively polarized eyewear, in which the observer wears eyewear that blocks one of two displayed images from each eye. Examples include passively polarized glasses, and rapidly alternating shuttered glasses [L. Lipton, et al., U.S. Pat. No. 4,523,226, Stereoscopic Television System, Jun. 11, 1985, incorporated by reference herein]. These techniques have become workhorses for professional uses, such as molecular modeling and some subfields of CAD. But they have not found wide acceptance for three dimensional viewing among most students, educators, graphic designers, CAD users (such as engineers and architects), or consumers (such as computer games players). Studies have shown that observers tend to dislike wearing any invasive equipment over their eyes, or wearing anything that impairs their general ambient visual acuity [D. Drascic, J. Grodski. Defence Teleoperation and Stereoscopic Video. Proc SPIE Vol. 1915, Stereoscopic Displays and Applications IV, pages 58–69, San Jose, Calif. Feb. 1993, incorporated by reference herein]. This consideration has motivated a number of non-invasive approaches to stereoscopic display that do not require the observer to don special eyewear.

A graphical display is termed autostereoscopic when all of the work of stereo separation is done by the display [J. Eichenlaub, Lightweight Compact 2D/3D Autostereoscopic LCD Backlight for Games, Monitor, and Notebook Applications. Proc. SPIE Vol. 3295, p. 180–185, in Stereoscopic Displays and Virtual Reality Systems V, Mark T. Bolas; Scott S. Fisher; John O. Merritt; Eds. Apr. 1998, incorporated by reference herein], so that the observer need not wear special eyewear. A number of researchers have developed displays which present a different image to each eye, so long as the observer remains fixed at a particular location in space. Most of these are variations on the parallax barrier method, in which a fine vertical grating or lenticular lens array is placed in front of a display screen. If the observer's eyes remain fixed at a particular location in space, then one eye can see only the even display pixels through the grating or lens array, and the other eye can see only the odd display pixels. This set of techniques has two notable drawbacks: (i) the observer must remain in a fixed position, and (ii) each eye sees only half the horizontal screen resolution.

Holographic and pseudo-holographic displays output a partial light-field, computing many different views simultaneously. This has the potential to allow many observers to see the same object simultaneously, but of course it requires far greater computation than is required by two-view stereo for a single observer. Generally only a 3D lightfield is generated, reproducing only horizontal, not vertical parallax.

A display which creates a light field by holographic light-wave interference was constructed at MIT by [S. Benton. The Second Generation of the MIT Holographic Video System. In: J. Tsujiuchi, J. Hamasaki, and M. Wada, eds. +Proc. of the TAO First International Symposium on Three Dimensional Image Communication Technologies. Tokyo, 6–7 Dec. 1993. Telecommunications Advancement Organization of Japan, Tokyo, 1993, pp. S-3-1-1 to -6, incorporated by reference herein]. The result was of very low resolution, but it showed the eventual feasibility of such an approach. Discrete light-field displays created by [J. R. Moore, N. A. Dodgson, A. R. L. Travis and S. R. Lang. Time-Multiplexed Color Autostereoscopic Display. Proc. SPIE 2653, SPIE Symposium on Stereoscopic Displays and Applications VII, San Jose, Calif., Jan. 28–Feb. 2, 1996, pp. 10–19, incorporated by reference herein], and the recent work by Eichenlaub [J. Eichenlaub. Multiperspective Lookaround Autostereoscopic Projection Display using an ICFLCD. Proc. SPIE Vol. 3639, p. 110–121, Stereoscopic Displays and Virtual Reality Systems VI, John O. Merritt; Mark T. Bolas; Scott S. Fisher; Eds., incorporated by reference herein], produce up to 24 discrete viewing zones, each with a different computed or pre-stored image. As each of the observer's eyes transitions from zone to zone, the image appears to jump to the next zone. A sense of depth due to stereo disparity is perceived by any observer whose two eyes are in two different zones.

Direct volumetric displays have been created by a number of researchers, such as [Elizabeth Downing et al. A Three-Color, Solid-State, Three-Dimensional Display. Science 273,5279 (Aug. 30, 1996), pp. 1185–118; R. Williams. Volumetric Three Dimensional Display Technology in D. McAllister (Ed.) Stereo Computer Graphics and other True 3D Technologies, 1993; and G. J. Woodgate, D. Ezra, et.al. Observer-tracking Autostereoscopic 3D display systems. Proc. SPIE Vol. 3012, p. 187–198, Stereoscopic Displays and Virtual Reality Systems IV, Scott S. Fisher; John O. Merritt; Mark T. Bolas; Eds., all of which are incorporated by reference herein]. One commercial example of such a display is Actuality Systems. A volumetric display does not create a true lightfield, since volume elements do not block each other. The effect is of a volumetric collection of glowing points of light, visible from any point of view as a glowing ghostlike image.

Autostereoscopic displays that adjust in a coarse way as the observer moves have been demonstrated by [G. J. Woodgate, D. Ezra, et. al. Observer-tracking Autostereoscopic 3D display systems. Proc. SPIE Vol. 3012, p.187–198, Stereoscopic Displays and Virtual Reality Systems IV, Scott S. Fisher; John O. Merritt; Mark T. Bolas; Eds., incorporated by reference herein]. The Dresden display [A. Schwerdtner and H. Heidrich. Dresden 3D display (D4D) . SPIE Vol. 3295, p. 203–210, Stereoscopic Displays and Virtual Reality Systems V, Mark T. Bolas; Scott S. Fisher; John O. Merritt; Eds., incorporated by reference herein] mechanically moves a parallax barrier side-to-side and slightly forward/back, in response to the observer's position. Because of the mechanical nature of this adjustment, there is significant "settling time" (and therefore latency) between the time the observer moves and the time the screen has adjusted to follow. In both of these displays, accuracy is limited by the need to adjust some component at sub-pixel sizes.

The goals of the present invention have been to present a single observer with an artifact-free autostereoscopic view of simulated or remotely transmitted three dimensional scenes. The observer should be able to move or rotate their head freely in three dimensions, while always perceiving proper stereo separation. The subjective experience should simply be that the monitor is displaying a three dimensional object. In order to be of practical benefit, the present invention provides a solution that could be widely adopted without great expense and that would not suffer from the factor-of-two loss of horizontal resolution which is endemic to parallax barrier systems.

These goals imposed certain design constraints. The user responsive adjustment could not contain mechanically moving parts, since that would introduce unacceptable latency. The mechanism could not rely on very high cost components and needed to be able to migrate to a flat screen technology.

The significance of the present invention is in that it enables a graphic display to assume many of the properties of a true three dimensional object. An unencumbered observer can walk up to an object and look at it from an arbitrary distance and angle, and the object will remain in a consistent spatial position. For many practical purposes, the graphic display subjectively becomes a three dimensional object. When combined with haptic response, this object could be manipulated in many of the ways that a real object can. Ubiquitous non-invasive stereo displays hold the promise of fundamentally changing the graphical user interface, allowing CAD program designers, creators of educational materials, and authors of Web interfaces (to cite only some application domains) to create interfaces which allow users to interact within a true three dimensional space.

SUMMARY OF THE INVENTION

The present invention pertains to an apparatus for displaying an image to an observer. The apparatus comprises a display screen upon which stripes of the image appear in at least three distinct phases. The apparatus comprises a light blocking shutter disposed in front of the display screen forming a stripe pattern which lets through only ⅓ of each stripe of the image on the display screen during each of the at least three distinct phases. The apparatus comprises a computer connected to the display screen and the light blocking shutter which changes the phases so in each phase the stripe pattern is shifted laterally, which renders 2 3D scenes corresponding to the eyes of the observer, which produces a proper left/right orientation pattern for each of the three phases and which interleaves the left/right orientations into three successive time phases as red, green and blue, respectively. The apparatus comprises an eye tracker for identifying the locations of the observers' eyes and providing the location to the computer.

The present invention pertains to a method for displaying an image to an observer. The method comprises the steps of identifying locations of the observer's eyes with an eye tracker. There is the step of sending the locations to a computer with the eye tracker. There is the step of rendering 2 3D scenes, one for each eye and for each of the three phases, a proper left/right alteration pattern which are interleaved into three successive time phases as red, green and blue, respectively. There is the step of displaying on a display screen stripes of the image in at least three distinct phases. There is the step of forming a stripe pattern which lets through only ⅓ of each stripe of the image on the display screen during each of the at least three distinct phases with a light blocking shutter disposed in front of the screen.

BRIEF DESCRIPTION OF THE DRAWINGS

In the accompanying drawings, the preferred embodiment of the invention and preferred methods of practicing the invention are illustrated in which:

FIG. 9 is a computer generated illustration which shows an image displayed on an unenhanced monitor.

FIGS. 10a and 10b are computer generated illustrations which show what the left and right eyes, respectively, would see with the present invention in place.

DETAILED DESCRIPTION

Figure 8:
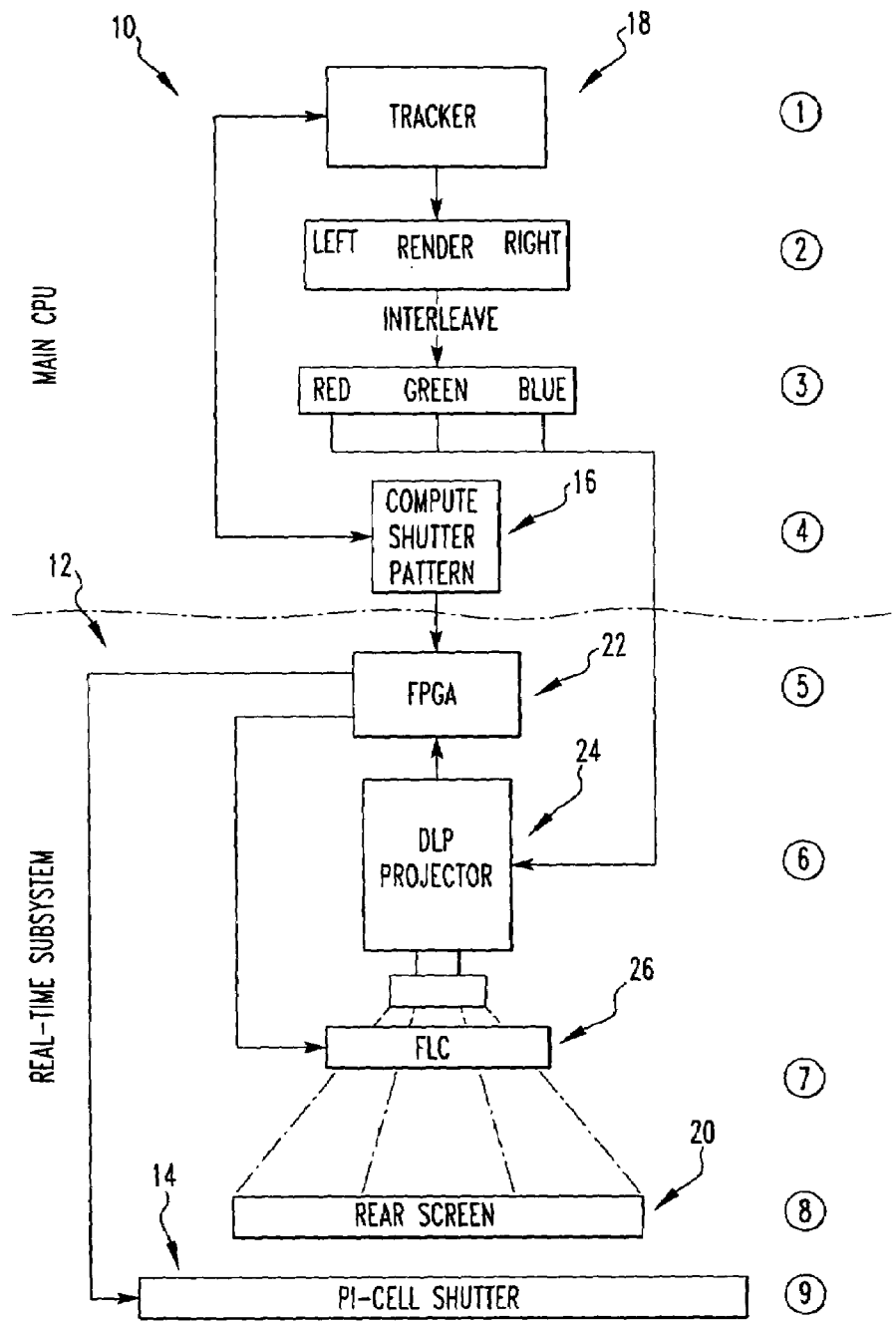
FIG. 8 is a flow chart of the present invention.

Referring now to the drawings wherein like reference numerals refer to similar or identical parts throughout the several views, and more specifically to FIG. 8 thereof, there is shown an apparatus 10 for displaying an image to an observer. The apparatus 10 comprises a display screen 12 upon which stripes of the image appear in at least three distinct phases. The apparatus 10 comprises a light blocking shutter 14 disposed in front of the display screen 12 forming a stripe pattern which lets through only ⅓ of each stripe of the image on the display screen 12 during each of the at least three distinct phases. The apparatus 10 comprises a computer 16 connected to the display screen 12 and the light blocking shutter 14 which changes the phases so in each phase the stripe pattern is shifted laterally, which renders two 3D scenes corresponding to the eyes of the observer, which produces a proper left/right orientation pattern for each of the three phases and which interleaves the left/right orientations into three successive time phases as red, green and blue, respectively. The apparatus 10 comprises an eye tracker 18 for identifying the locations of the observers' eyes and providing the location to the computer 16.

Preferably, the display screen 12 includes a rear projection screen 20. The display screen 12 preferably includes a field programmable gate array 22 in communication with the projection screen and the shutter which synchronizes the phases between the shutter and the projection screen. Preferably, the display screen 12 includes a digital light processor projector 24 in communication with the array and the projection screen which displays the three phases of images sequentially and controls the timing of the phases.

The display screen 12 preferably includes a ferroelectric liquid crystal 26 in communication with the array, the light processor, and the projection screen which shutters the start and stop of each phase. Preferably, the shutter includes a pi-cell.

The present invention pertains to a method for displaying an image to an observer. The method comprises the steps of identifying locations of the observer's eyes with an eye tracker 18. There is the step of sending the locations to a computer 16 with the eye tracker 18. There is the step of rendering 2 3D scenes, one for each eye and for each of the three phases, a proper left/right alteration pattern which are interleaved into three successive time phases as red, green and blue, respectively. There is the step of displaying on a display screen 12 stripes of the image in at least three distinct phases. There is the step of forming a stripe pattern which lets through only ⅓ of each stripe of the image on the display screen 12 during each of the at least three distinct phases with a light blocking shutter 14 disposed in front of the screen.

Preferably, the forming step includes the step of encoding into 3 1-dimensional bit-maps the three phases of stripe for the light shutter, each indicating an on-off pattern for shutter micro-stripes at one of the three phases; and sending these bit-maps to a field programmable gate array 22 of the display screen 12. The forming step preferably includes the step of sending with the field programmable gate array 22 the three bit-patterns to a pi-cell light shutter in rotating sequence.

Preferably, the forming step includes the step of controlling with a digital light processor projector 24 of the display screen 12 timing of the rotating sequence of the three-bit patterns to the pi-cell. The displaying step preferably includes the step of displaying with the digital light processor projector 24 the three image phases in succession.

In the operation of the invention, a modified parallax barrier was created that combines spatial multiplexing and temporal multiplexing. Since no fixed parallax barrier geometry could accommodate arbitrary observer position and orientation, a dynamically varying parallax barrier was created, one that continually changes the width and positions of its stripes as the observer moves. The use of a virtual dynamic parallax barrier is reminiscent of work by [J. R. Moore, N. A. Dodgson, A. R. L. Travis and S. R. Lang. Time-Multiplexed Color Autostereoscopic Display. Proc. SPIE 2653, SPIE Symposium on Stereoscopic Displays and Applications VII, San Jose, Calif., Jan. 28–Feb. 2, 1996, pp. 10–19 and J. Eichenlaub. Multiperspective Look-around Autostereoscopic Projection Display using an ICFLCD. Proc. SPIE Vol. 3639, p. 110–121, Stereoscopic Displays and Virtual Reality Systems VI, John O. Merritt; Mark T. Bolas; Scott S. Fisher; Eds., both of which are incorporated by reference herein], but to very different ends—instead of using a fixed dynamic pattern to create a fixed set of viewpoints, a result which is continually exact for one moving user was created.

Each dynamic stripe needs to be highly variable in its width, in order to accommodate many different positions and orientations of the observer. For this reason, the dynamic stripes were made rather large, and use a correspondingly large gap between the display screen 12 and the light-blocking parallax barrier. Because the stripes are large enough to be easily visible, they were needed to be made somehow unnoticeable. To do this, they were rapidly animated in a lateral direction. The observer then cannot perceive the individual stripes, just as a passenger in a car speeding alongside a picket fence cannot see the individual fence posts.

This large-stripe approach requires each stripe to be composed from some number of very slender microstripes, each of which is an individually switchable liquid crystal 26 display element. To sum up: a dynamic parallax barrier was used consisting of very large stripes, which are made out of many slender ones, and these large stripes are moved so rapidly across the image that the observer cannot perceive them.

Figure 1A:
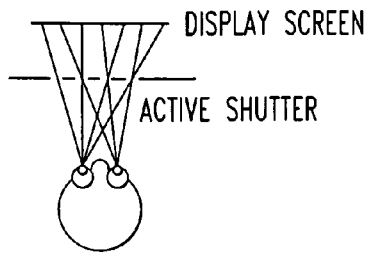
FIGS. 1a and 1b show an observer's eyes seeing half of the respective image through each eye, and the other half of each respective image, respectively.
Figure 1B:
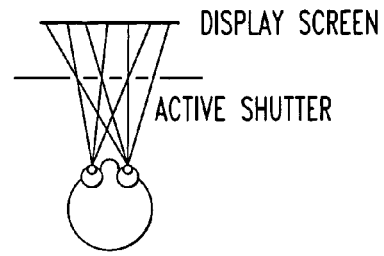

In a perfect world, a temporally multiplexed system could be made from just two alternating phases. Parallax barrier systems depend on the distance E between an observer's two eyes (generally about 2.5 inches). Suppose that a display screen 12 D inches away from the observer showed alternating stripes of a left and a right image. Suppose also that a light-blocking shutter were placed G inches in front of this display screen 12 in a "picket fence" stripe pattern. If the width of each shutter stripe were chosen as $E*G/D$, and the width of each image stripe as $E*G/(D-G)$, then during phase 1 the observer's left eye would be able to see half of one image through the clear stripes, and the observer's right eye would be able to see half of the other image through the clear stripes [FIG. 1a]. If the light-blocking shutter were then flipped, and the display screen 12 pattern simultaneously changed, then the observer would see the remainder of each respective image [FIG. 1b]. If this flipping were done fast enough, then the observer would perceive two complete independent images, each visible only to one eye. The problem with this scenario is that the observer would need to be in precisely the correct position; the slightest deviation to the left or right would result in the wrong eye seeing a sliver of the wrong image.

Figure 2A:
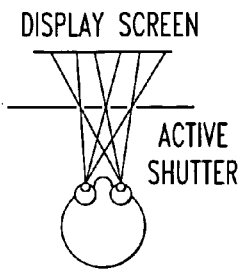
FIGS. 2a, 2b and 2c show the use of three phases.
Figure 2B:
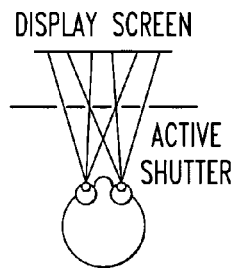
Figure 2C:
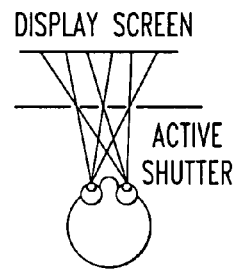

For this reason, the stripes are animated in three phases. During each phase, the light-blocking shutter lets through only one third of each stripe. After each phase the stripe pattern is shifted laterally. Over the course of three phases, the observer's left eye sees one entire image, and the observer's eye sees a different entire image. The use of three phases guarantees that there is room for error in the observer's lateral position [FIGS. 2a, 2b, 2c].

Figure 3A:
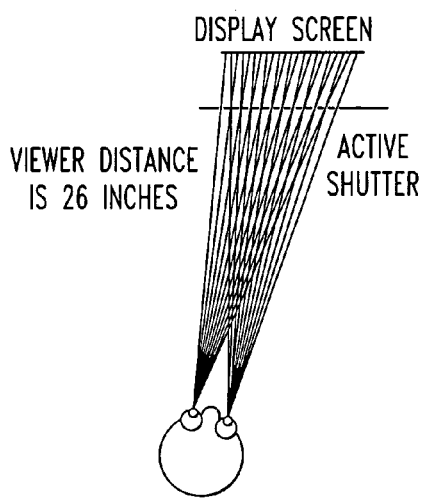
FIGS. 3a and 3b show the observer far and near, respectively, from the shutter.
Figure 3B:
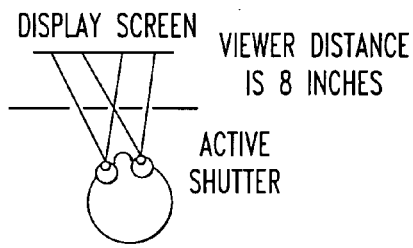

The observer can be at a wide range of distances, since the stripe width can always be varied so as to equal $E*G/D$, as described above. FIG. 3a shows the observer relatively far; FIG. 3b shows the observer much closer. Microstripe resolution puts a practical upper limit on the observer distance, since the stripes become narrower as the observer's distance to the screen increases.

This upper limit increases linearly both with the gap between the display and shutter, and with the shutter resolution. In practice, these have been set so as to be able to handle an observer up to about five feet away.

Figure 4:
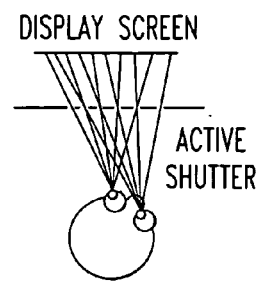
FIG. 4 shows the stripes vary in width in a perspective linear pattern.

In previous autostereoscopic techniques based on parallax barriers, all stripes were required to be of equal width. This presents a problem if the observer's head is facing off to the side. This will often be true when the observer has other displays or paperwork in his field of view, or is engaged in conversation with a colleague. In this case, one of the observer's eyes will be perhaps an inch or so closer to the screen than the other. When this happens, it no longer suffices for the barrier stripes to be all of equal width. Rather, in this case the stripes should vary in width in a perspective-linear pattern [FIG. 4].

The dynamically varying stripe generation here handles this case accurately. Given any two eye positions, the proper perspective linear stripe pattern is computed and displayed. The mathematics to support this are described below.

The mathematics needed to properly place the stripes are now described. To make the light blocking work properly, the left and right images need to be interleaved on the display and also a corresponding set of opaque/clear stripes on the optical shutter need to be created. To compute where the stripes should go, a system of crossed lines is used:

Starting from the right eye and the left-most point on the display, draw a straight line, and see where it crosses the shutter. Then draw a line from the left eye through this point on the shutter, and see where this new line hits the display. This process is continued, always starting with this next point over on the display, to produce an effective pattern of left/right image display stripes and light-blocking shutter stripes for that pair of eye positions.

Figure 5A:
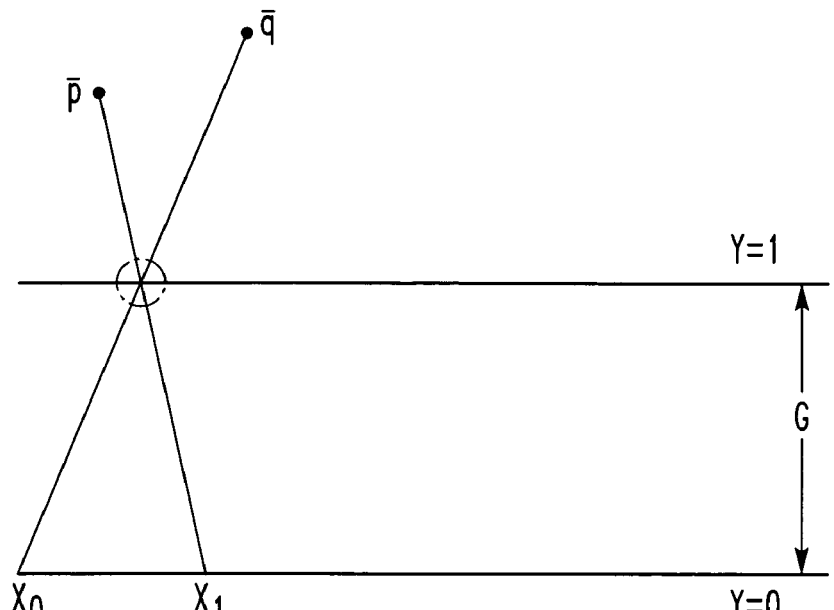
FIGS. 5a and 5b show the processes of the present invention after 1 iteration and 3 iterations, respectively.
Figure 5B:
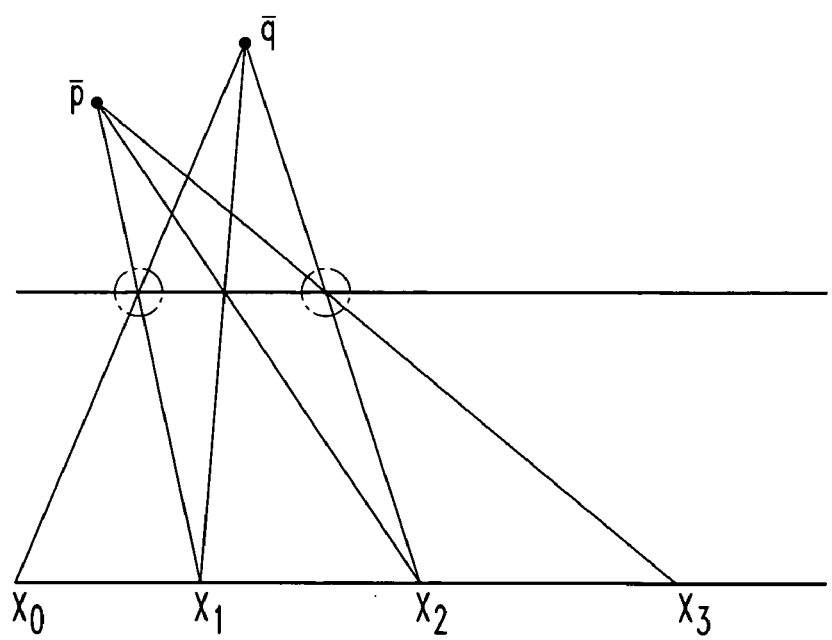

Starting at one side of the display, the lines on the shutter are crossed as follows:
1. Draw a line from $x_n$ on the display, through the shutter, to the right eye;
2. Draw a line from the left eye, through the shutter, to $x_{n+1}$ on the display;
3. Iterate FIGS. 5a, 5b show how to construct a sequence of stripe positions from two eye positions (shown as a green and red dot, respectively), a display surface (shown as the bottom of the two horizontal lines) and a shutter surface (shown as the top of the two horizontal lines). Starting from the left side of the display screen 12, calculate the line of sight through the shutter to the right eye. Then compute the line of sight from the left eye, through this point, down onto the display screen 12. FIG. 5a shows this process after one iteration; FIG. 5b shows the same process after three iterations. In these figures, the positions at which the shutter needs to be transparent are circled in gray.

The mathematical details for this process are now described. To place the stripes properly on the display screen 12, assume the two eye positions are: $p=(p_x, p_y)$ and $q=(q_x, q_y)$, that the display screen 12 is on the line y=0, and that the shutter is on the line y=1. Given a location (x, 0) on the display screen 12, find the line-of-sight location $f_p(x)$ on the shutter that lies between display screen 12 location (x,0) and eye position p by linear interpolation:

$$f_p(x)=p_x p_y^{-1}+x(1-p_y^{-1})$$

Given a location (x,1) on the shutter, one can find the corresponding line-of-sight location on the display screen 12 by inverting the above equation:

$$f_p^{-1}(x)=(x-p_x p_y^{-1})/(1-p_y^{-1})$$

Therefore, given a location $x_n$ on the display screen 12 that is visible through a clear stripe on the shutter from both p and q, the next such location is given first by finding the location on the shutter $f_p(x_n)$ in the line-of-sight from p, and then finding the corresponding location on the display screen 12 which is in the line-of-sight from q:

$$x_{n+1}=f_q^{-1}(f_p(x_n))$$

which expands out to:

$$(p_x p_y^{-1}+x(1-p_y^{-1})-q_x q_y^{-1})/(1-q_y^{-1})$$

This can be expressed as a linear equation $x_{n+1}=A x_n+B$, where:

$$A=x(1-p_y^{-1})/(1-q_y^{-1})$$

$$B=(p_x p_y^{-1}-q_x q_y^{-1})/(1-q_y^{-1})$$

The nth location in the sequence of stripe locations on the display screen 12 can be calculated by iterating $x_{n+1}=A x_n+B$:

$$x_0=0 \quad x_1=B \quad x_2=AB+B$$

$$x_3=A^2B+AB+B$$

$$x_n=B(A^{n-1}+\ldots+A+1)$$

In the above sequence, the even terms locate the centers of those portions of the image visible from the right eye, and the odd terms locate the centers of those portions of the image visible from the left eye. The openings in the shutter are centered at $$f_q^{-1}(x_0), f_q^{-1}(x_2), \text{etc.}$$

Various physical arrangements could be used to implement this technique. For our first implementation, an approach was used that would allow the greatest flexibility and ability to conduct tests. For the display screen 12, a Digital Light Processor (DLP) micro-mirror projector from Texas Instruments was used, because DLP projectors handle R,G,B sequentially. This allowed the use of color to encode the three time-sequential phases. A Ferroelectric Liquid Crystal (FLC) element from Displaytech to shutter the start/stop time of each temporal phase was used.

For the light-blocking shutter, a custom pi-cell liquid crystal 26 screen built to our specifications by LXD was used, which was driven from power ICs mounted on a custom-made Printed Circuit Board (PCB). To control the sub-frame timings, a Field Programmable Gate Array (FPGA) from Xilinx was used. These were all driven from a Pentium II PC, running OpenGL in Windows NT.

As flowcharted in FIG. 8, the steps to display a frame are:
(1) An eye tracker 18 locates the observer's eyes, and sends this information to the CPU.
(2) The main CPU uses the eye tracker 18 info to render two 3D scenes: one as seen from each eye.
(3) The main CPU also uses the eye tracker 18 info to compute, for each of three phases, the proper left/right alternation pattern. These are interleaved into three successive time phases as red, green, and blue, respectively.
(4) The main CPU also uses the eye info to compute the three phases of stripe on the light shutter. These are encoded into three one-dimensional bit-maps, each indicating an on-off pattern for the shutter micro-stripes at one of the three phases. These bit-maps are shipped to the FPGA.
(5) The FPGA sends the three bit-patterns to the pi-cell light shutter in rotating sequence, every 1/180 second. The timing for this is controlled by the DLP projector, which produces a signal every time its color wheel advances.
(6) The DLP projector displays the three image phases in succession. The color wheel on the projector is removed, so that each of the red, green, and blue components displays as a gray scale image.
(7) The FLC element is modulated by the FPGA to block the light from the DLP projector lens in a 180 Hz square wave pattern. This allows finer control over timing.

(8) A rear projection screen 20 (RPS) diffuses the image from the DLP projector.

(9) The pi-cell light shutter positioned in front of the RPS displays a different horizontally varying on-off pattern every 1/180 second.

Steps (5) through (9) above are part of the "real-time subsystem" which is monitored by the FPGA. These parts of the process are monitored continuously by the FPGA to synchronize all the events which must occur simultaneously 180 times per second.

Figures 6A, 6B:
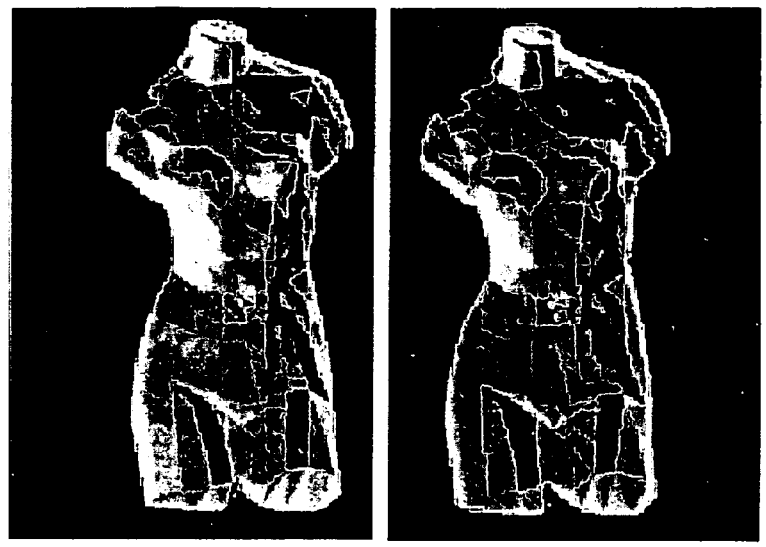
FIGS. 6a and 6b are computer generated illustrations which show separate left and right images, respectively.

OpenGL is used to encode the red/green/blue sub-images which the DLP projector will turn into time sequential phases. To do this, first render the compute separate left and right images in OpenGL, into off-screen buffers, as shown in FIGS. 6a, 6b.

Figures 7A, 7B, 7C:
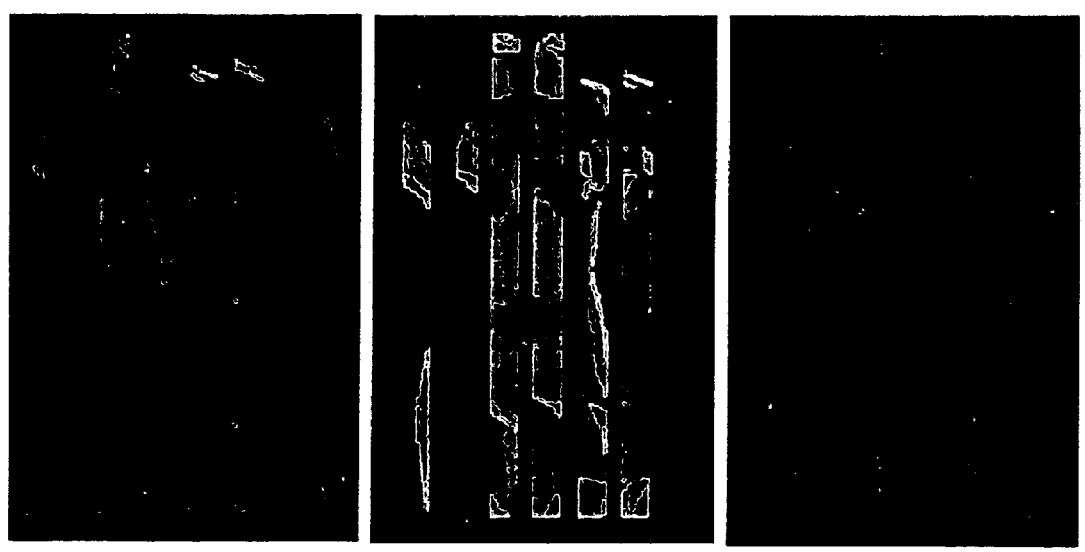
FIGS. 7a, 7b and 7c are computer generated illustrations which show the red, green and blue components, respectively.

Then slice each of these into their component image stripes, and reconstruct into three interleaved images that will be displayed in rapid sequence, as red, green, and blue components, as shown in FIGS. 7a, 7b, 7c, respectively, which are computer generated illustrations.

If this image were simply displayed on an unenhanced monitor, it would appear as in FIG. 9, which is a computer generated illustration. When filtered through the light-blocking shutter, each of the observer's eyes will reconstruct a complete image from a single viewpoint. If the DLP projector's color wheel were engaged, then the left and right eyes would see FIG. 10a and FIG. 10b, respectively, which are computer generated illustrations. With the color wheel removed, each of the observer's eyes simply sees the correct stereo component image of FIG. 6a and FIG. 6b, respectively.

There are two types of timing that need to be addressed for this display: frame time, and shutter switching time.

In order to prevent eyestrain due to movement latency, it is desired to maintain a frame refresh rate of at least 60 Hz, with a latency within 1/60 second between the moment the observer's head moves and the moment the correct image is seen. This consideration drove the timing design goals for the display: to be able to respond within the 1/60 interval from one screen refresh to the next. Within this time window, standard assumptions are made: that there is a known and fixed small latency to compute a frame, and that a Kalman filter [M. Grewal, A. Andrews, Kalman Filtering: Theory and Practice, Prentice Hall, 1993, incorporated by reference herein] can extrapolate from recent eye-tracking samples to predict reasonable eye positions at the moment of the next display refresh. If the user's head is moving, then the host computer 16 should ideally compute the left and right images and merge them within this 1/60 second window.

The real-time subsystem maintains a more stringent schedule: a synchronous 180 Hz cycle. The pattern on the light-shutter needs to switch at the same moment that the DLP projector begins its red, green, or blue component. This timing task is handled by the FPGA, which reads a signal produced by the projector every time it the color wheel cycles (about once every 1/180 second) and responds by cycling the light shutter pattern. To help tune the on/off timing, the FPGA modulates a ferro-electric optical switch which is mounted in front of the projector lens.

The main CPU is not involved at all in this fine-grained timing. The only tasks required of the CPU are to produce left/right images, to interleave them to create a red/green/blue composite, and to put the result into an on-screen frame buffer, ideally (but not critically) at 60 frames per second.

Figure 11:
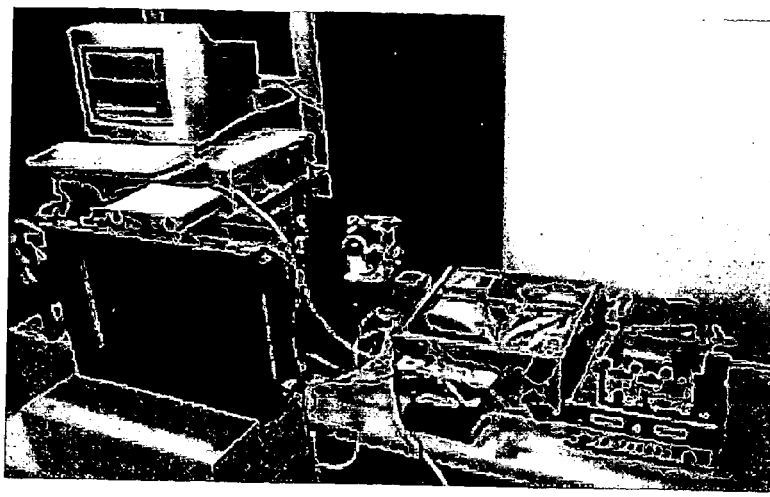
FIG. 11 is a computer generated illustration which shows the apparatus of the present invention.

The essential components used to implement this process are shown in FIG. 11, which is a computer 16 generated illustration. Each is described in some detail.

Every 1/180 of a second (three times per frame, from the observer's point of view), the light shutter with a different phase pattern of on/off stripes is needed to be updated. To do this quickly enough, an ISA interface board was built with a non volatile Xilinx 95C108 PLD and a reconfigurable Xilinx XC4005E FPGA. The PLD is used to generate the ISA Bus Chip Select signals and to reprogram the FPGA. The XC4005E is large enough to contain six 256 bit Dual Ported RAMs (to double buffer the shutter masks needed for our three phases), the ISA Bus logic, and all the hardware needed to process the DLP signals and drive the pi-cell. When loaded with the three desired patterns from the main CPU, this chip continually monitors the color wheel signals from the DLP projector. Each time it detects a change from red to green, green to blue, or blue to red, it sends the proper signals to the Supertex HV57708 high voltage Serial to parallel converters mounted on the Pi-cell, switching each of the light shutter's 256 microstripes on or off.

A standard twisted nematic liquid crystal 26 display (such as is widely used in notebook computers) does not have the switching speed needed; requiring about 20 msec to relax from its on state to its off state after charge has been removed. Instead, a pi-cell is used, which is a form of liquid crystal 26 material in which the crystals twist by 180° (hence the name) rather than that 90° twist used for twisted nematic LC displays.

Pi-cells have not been widely used partly because they tend to be bistable—they tend to snap to either one polarization or another This makes it difficult to use them for gray scale modulation. On the other hand, they will relax after a charge has been removed far more rapidly than will twisted nematic—a pi-cell display can be driven to create a reasonable square wave at 200 Hz. This is precisely the characteristic needed—an on-off light blocking device that can be rapidly switched. Cost would be comparable to that of twisted nematic LC displays, if produced at comparable quantities.

Figure 12A:
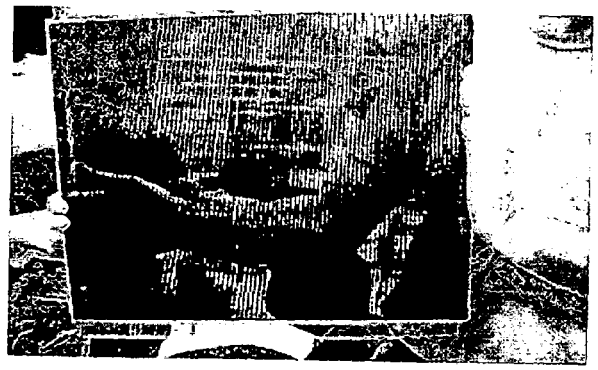
FIGS. 12a and 12b are computer generated illustrations which show a pi-cell.
Figure 12B:

FIG. 12a and FIG. 12b, which are computer generated illustrations, show the pi-cell device that was manufactured by LXD. The image to the left shows the size of the screen, the close-up image the right shows the individual microstripes and edge connectors. The active area is 14"×12", and the microstripes run vertically, 20 per inch. The microstripe density could easily have exceeded 100 per inch, but the density chosen required to drive only 256 microstripes, and was sufficient for a first prototype. Edge connectors for the even microstripes run along the bottom; edge connectors for the odd microstripes run along the top. Four power chips to maintain the required 40 volts, each with 64 pin-outs were used. Two chips drive the 128 even microstripes from a PCB on the top of the shutter, the other two drive the 128 odd microstripes from a PCB along the bottom. To turn a microstripe transparent, drive it with a 5 volt square wave at 180 Hz. To turn a microstripe opaque, drive it with a 40 volt square wave at 180 Hz.

A ferro-electric liquid crystal 26 (FLC) will switch even faster than will a pi-cell, since it has a natural bias that allows it to be actively driven from the on-state to the off-state and back again. A ferro-electric element can be switched in 70 microseconds. Unfortunately ferro-electric elements are very delicate and expensive to manufacture at large scales, and would therefore be impractical to use as the light shutter. However, at small sizes they are quite practical and robust to work with. A small ferro-electric switch was used over the projector lens, manufactured by Displaytech, to provide a sharper cut-off between the three phases of the shutter sequence. This element is periodically closed between the respective red, green, and blue phases of the DLP projector's cycle. While the FLC is closed, the pi-cell microstripes transitions (which require about 1.2 ms) are effected.

After surveying a number of different non-invasive eye tracking technologies available, retroreflective camera based tracking was used. Because the back of the human eyeball is spherical, the eye will return light directly back to its source.

A system based on this principle sends a small infrared light from the direction of a camera during only the even video fields. The difference image between the even and odd video fields will show only two glowing spots, locating the observer's left and right eyes, respectively. By placing two such light/camera mechanisms side-by-side, and switching them on during opposite fields (left light on during the even fields, and right light on during the odd fields), the system is able to simultaneously capture two parallax displaced images of the glowing eye spots. The lateral shift between the respective eye spots in these two images is measured, to calculate the distance of each eye.

The result is two (x,y,z) triplets, one for each eye, at every video frame. A Kalman filter [M. Grewal, A. Andrews, Kalman Filtering: Theory and Practice, Prentice Hall, 1993, incorporated by reference herein] is used to smooth out these results and to interpolate eye position during the intermediate fields. A number of groups are planning commercial deployment of retroreflective-based tracking in some form, including IBM. For calibration tests, the DynaSite from Origin Systems were use, which requires the user to wear a retroreflective dot, but does not block the user's line of sight.

The user tracking provides as a pair of 3D points, one for each eye. As noted above, this information is used in three ways. (i) Each of these points is used by OpenGL as the eye point from which to render the virtual scene into an offscreen buffer; (ii) The proper succession lateral locations for left/right image interleaving is calculated, which is used to convert the left/right offscreen images into the three temporally phased images; (iii) The proper positions for the light shutter transitions are calculated. This information is converted to three one dimensional bit-maps, each indicating an on-off pattern for the shutter micro-stripes at one of the three phases. This information is sent to the FPGA, which then sends the proper pattern to the light shutter every $\frac{1}{180}$ second, synchronously with the three phases of the DLP projector.

The goals of the present invention of the system were (i) low latency and (ii) absence of artifacts.

The most important question to answer is: "does it work?" The answer is yes. The experience is most compelling when objects appear to lie near the distance of the display screen 12, so that stereo disparity is reasonably close to focus (which is always in the plane of the projection screen). When the system is properly tuned, the experience is compelling; as an observer looks around an object, it appears to float within the viewing volume. The observer can look around the object, and can position himself or herself at various distances from the screen as well. Special eyewear is not required.

The system always kept up with the renderer. The software-implemented renderer did not achieve a consistent 60 frames per second, but rather something closer to 30 frames per second. In practice this meant that if the observer darted his/her head about too quickly, the tracker could not properly feed the display subsystem when the user moved his/her head rapidly.

The more critical issue is that of position-error based artifacts. It is crucial for the system to be calibrated accurately, so that it has a correct internal model of the observer's position. If the tracker believes the observer is too near or far away, then it will produce the wrong size of stripes, which will appear to the observer as vertical stripe artifacts (due to the wrong eye seeing the wrong image) near the sides of the screen. If the tracker believes the observer is displaced to the left or right, then this striping pattern will cover the entire display. A careful one-time calibration removed all such artifacts. This emphasizes the need for good eye position tracking.

An alternate version of this display works in full color with current stereo-ready CRT monitors. This requires a more sophisticated light-blocking shutter, since CRT monitors use a progressive scan, rather than displaying an entire image at once. For this reason, this version of the shutter has separately addressable multiple bands from top to bottom, triggered at different times within the CRT monitor's scan cycle. This version is in full color, since it will create phase differences by exploiting the time variation between different portions of the full-color CRT's vertical scan, instead of relying on sequential R, G, B to produce time phases.

In parallel, a switchable flat-panel display is being created. This version would be in full color, since it would not rely on sequential R, G, B. A goal for this flat-panel based version is a hand-held "gameboy" or "pokémon" size platform, for personal autostereoscopic displays.

This display platform can be used for teleconferencing. With a truly non-invasive stereoscopic display, two people having a video conversation can perceive the other as though looking across a table. Each person's image is transmitted to the other via a video camera that also captures depth [T. Kanade, et al. Development of a Video Rate Stereo Machine. Proc. of International Robotics and Systems Conference (IROS-95), Pittsburgh, Pa., Aug. 7–9, 1995, incorporated by reference herein]. At the recipient end, movements of the observer's head are tracked, and the transmitted depth-enhanced image is interpolated to create a proper view from the observer's left and right eyes, as in [S. Chen and L. Williams. View Interpolation for Image Synthesis. Computer Graphics (SIGGRAPH 93 Conference Proc.) p. 279–288, incorporated by reference herein]. Head movements by each participant reinforce the sense of presence and solidity of the other, and proper eye contact is always maintained.

An implementation of an API for game developers is possible so that users of accelerator boards for two-person games can make use of the on-board two-view hardware support provided in those boards to simultaneously accelerate left and right views in the display. Variants of this system for two observers are also possible.

Figure 13:
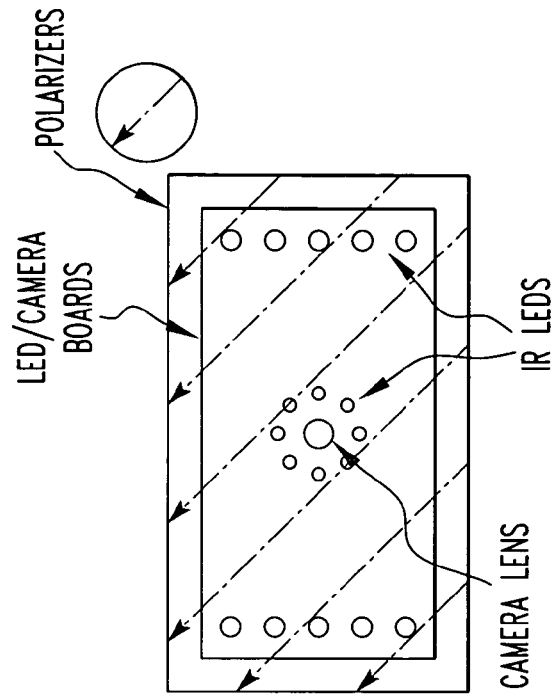
FIG. 13 shows a stereo embodiment of the present invention.
Figure 13:
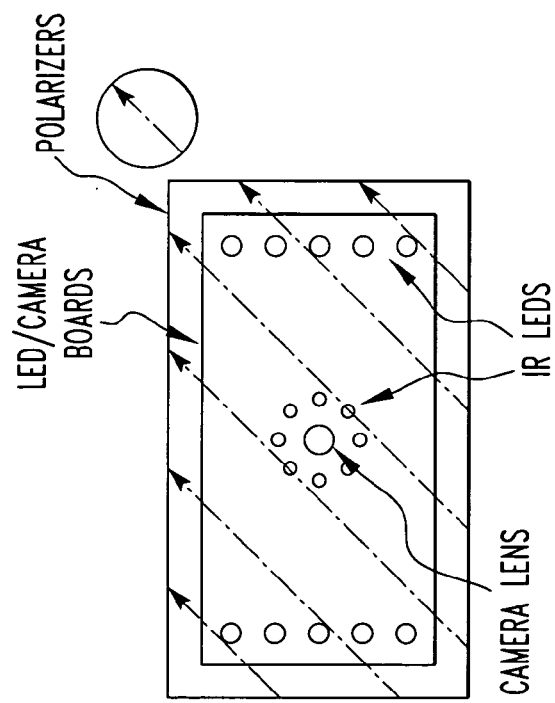

FIG. 13 shows two cameras with active IR illumination to detect a "red-eye" image and subtract it from a "normal image". IR polarizers separate the optical illumination paths of the two cameras, making the system far less prone to errors in a stereo mode.

See also U.S. patent application Ser. No. 09/312,988, filed May 17, 1999; which is a continuation-in-part of U.S. Pat. No. 6,061,084 filed on Jan. 21, 1998, both of which are incorporated by reference herein, and from which this application claims priority and from which this application is a continuation-in-part.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for displaying an image to an observer comprising:
   a display screen upon which stripes of the image appear in at least three distinct phases;
   a light blocking shutter disposed in front of the display screen forming a stripe pattern which lets through only ⅓ of each stripe of the image on the display screen during each of the at least three distinct phases;
   a computer connected to the display screen and the light blocking shutter which changes the phases so in each phase the stripe pattern is shifted laterally, which renders 2 3D scenes corresponding to the eyes of the observer for arbitrary observer position and orientation, which produces a proper left/right orientation pattern for each of the three phases and which interleaves the left/right orientations into three successive time phases as red, green and blue, respectively, and that continually changes the width and positions of the stripes as the observer moves; and
   an eye tracker for identifying the locations of the observers' eyes and providing the location to the computer.

2. An apparatus has described in claim 1 wherein the display screen includes a rear projection screen.

3. An apparatus as described in claim 2 wherein the display screen includes a field programmable gate array in communication with the projection screen and the shutter which synchronizes the phases between the shutter and the projection screen.

4. An apparatus as described in claim 3 wherein the display screen includes a digital light processor projector in communication with the array and the projection screen which displays the three phases of images sequentially and controls the timing of the phases.

5. An apparatus as described in claim 4 wherein the display screen includes a ferroelectric liquid crystal in communication with the array, the light processor, and the projection screen which shutters the start and stop of each phase.

6. An apparatus as described in claim 5 wherein the shutter includes a pi-cell.

7. A method for displaying an image to an observer comprising the steps of:
   identifying locations of the observer's eyes with an eye tracker;
   sending the locations to a computer with the eye tracker;
   rendering two 3D scenes, one for each eye for arbitrary observer position and orientation and for each of the three phases, a proper left/right alteration pattern which are interleaved into three successive time phases as red, green and blue, respectively;
   displaying on a display screen stripes of the image in at least three distinct phases; and
   forming a stripe pattern which lets through only ⅓ of each stripe of the image that continually changes the width and positions of the stripes as the observer moves on the display screen during each of the at least three distinct phases with a light blocking shutter disposed in front of the screen.

8. A method as described in claim 7 wherein the forming step includes the step of encoding into 3 1-dimensional bit-maps the three phases of stripe for the light shutter, each indicating an on-off pattern for shutter micro-stripes at one of the three phases; and sending these bit-maps to a field programmable gate array of the display screen.

9. A method as described in claim 8 wherein the forming step includes the step of sending with the field programmable gate array the three bit-patterns to a pi-cell light shutter in rotating sequence.

10. A method as described in claim 9 wherein the forming step includes the step of controlling with a digital light processor projector of the display screen timing of the rotating sequence of the three-bit patterns to the pi-cell.

11. A method as described in claim 10 wherein the displaying step includes the step of displaying with the digital light processor projector the three image phases in succession.

12. A displayer comprising:
    a sensor mechanism for identifying at least one of tilt and rotation of at least one viewer's head; and
    a mechanism for displaying a plurality of images to one or more viewers wherein at least a portion of the images are a function of at least one of tilt and rotation of at least one viewer's head, said displaying mechanism in communication with the sensor mechanism, the displaying mechanism includes a computer which receives information from the sensor mechanism identifying at least one of tilt and rotation of at least one viewer's head and produces said images, the computer causes the images to be displayed.

13. A displayer as described in claim 12 wherein at least one of a spacing pattern or a stripe pattern of the first image and second image varies as a function of at least one of the tilt and rotation of the at least one viewer's head.

14. A displayer as described in claim 12 wherein the spacing pattern is a tapered perspective pattern.

15. A displayer as described in claim 14 wherein the tapered perspective pattern is linear.

16. A displayer as described in claim 12 wherein the stripe pattern is used to interleave the first and second views.

17. A displayer as described in claim 16 wherein the interleaving is at least one of time and space multiplexed.

18. A displayer as described in claim 12 wherein the sensor is an imaging device.

19. A displayer as described in claim 12 wherein the sensor mechanism identifies viewer head tilt and head rotation.

20. A displayer as described in claim 12 wherein the sensor mechanism and the display medium are connected via at least one of a network connection and an internet connection.

21. A displayer comprising:
    a sensor mechanism for identifying where V viewers are in space, where V is greater than or equal to 1 and is an integer; and
    a displaying mechanism for displaying U different images to V different viewers where each image is a function of where each viewer is in space to which the respective image is associated, where U is greater than or equal to 1 and is an integer, said displaying mechanism remote and apart from and out of contact with the V viewers, said displaying mechanism in communication with the sensor mechanism, the displaying mechanism includes a computer which receives information from the sensor mechanism identifying where each viewer is in space and produces said images, the computer causes a first image of the U images and a second image of the U images associated with a first viewer of the V viewers to be shown interleaved on the first screen wherein spacing between the interleaved first image and second image varies as a function of where each viewer is in space to which the respective image is associated.

* * * * *

UNITED STATES PATENT AND TRADEMARK OFFICE
CERTIFICATE OF CORRECTION

| | | |
|---|---|---|
| PATENT NO. | : 7,239,293 B2 | |
| APPLICATION NO. | : 09/909927 | |
| DATED | : July 3, 2007 | |
| INVENTOR(S) | : Perlin et al. | |

It is certified that error appears in the above-identified patent and that said Letters Patent is hereby corrected as shown below:

Column 1, line 2, below "Title" insert -- CROSS-REFERENCE TO RELATED APPLICATIONS --.

Column 13, line 26, in Claim 2, delete "apparatus has described" and insert -- apparatus as described --.

Column 14, line 54, in Claim 21, delete "dis playing" and insert -- displaying --.

Signed and Sealed this
Twenty-fifth Day of September, 2012

David J. Kappos
*Director of the United States Patent and Trademark Office*